June 21, 1960 S. LUBKIN 2,941,718

PUNCHED RECORD TRANSLATOR

Filed Oct. 29, 1953 5 Sheets-Sheet 1

INVENTOR.
SAMUEL LUBKIN

BY S.C. Yuter

ATTORNEY.

June 21, 1960 S. LUBKIN 2,941,718

PUNCHED RECORD TRANSLATOR

Filed Oct. 29, 1953 5 Sheets-Sheet 2

INVENTOR.
SAMUEL LUBKIN

BY S. C. Yuter

ATTORNEY.

June 21, 1960 S. LUBKIN 2,941,718

PUNCHED RECORD TRANSLATOR

Filed Oct. 29, 1953 5 Sheets-Sheet 3

INVENTOR.
SAMUEL LUBKIN

BY S. C. Yuter

ATTORNEY.

June 21, 1960

S. LUBKIN 2,941,718

PUNCHED RECORD TRANSLATOR

Filed Oct. 29, 1953

5 Sheets-Sheet 4

DETECTOR 163

INVENTOR.
SAMUEL LUBKIN

BY [signature]

ATTORNEY.

June 21, 1960 S. LUBKIN 2,941,718

PUNCHED RECORD TRANSLATOR

Filed Oct. 29, 1953 5 Sheets-Sheet 5

INVENTOR.
SAMUEL LUBKIN

BY S. C. Yuter

ATTORNEY.

United States Patent Office 2,941,718

Patented June 21, 1960

2,941,718

PUNCHED RECORD TRANSLATOR

Samuel Lubkin, Brooklyn, N.Y., assignor, by mesne assignments, to Curtiss-Wright Corporation, Carlstadt, N.J., a corporation of Delaware Filed Oct. 29, 1953, Ser. No. 389,047

7 Claims. (Cl. 235—61.11)

This invention relates to apparatus for interpreting information stored in punched hole form on a recording medium, and more particularly to a punched record reading device capable of translating stored information to electrical signals at high speed.

In modern punched record machines, it is customary to store information in coded form by punching predetermined combinations of holes in transverse sections of the recording medium such that each coded combination of holes represents a character. The binary system is particularly adaptable to this type of storage as a perforated position may represent either 1 or 0, and, correspondingly, a non-perforated position may represent either 0 or 1. A transverse section containing a combination of perforated and non-perforated positions may denote numeric, alphabetic or order information.

To translate the information to electrical signals the record medium is passed through the sensing portion of a translator unit having a plurality of mechanical feelers corresponding in number to the code that is employed. The feelers successively sense the code combinations perforated in the transverse sections and operate a mechanical distributor which transmits coded pulse signals. This type of mechanical signalling system is cumbersome and slow and thus limits the speed of translation of the coded pulse signals.

One method of reading punched records at higher speed has been to photo-electrically scan the various combinations of holes. This method is relatively inconvenient and expensive since it usually requires a high-intensity light source, a photocell for each hole position, and an optical system to direct the light passing through the holes to the photocells, and suitable amplifiers.

Accordingly, it is an object of the present invention to provide a device which simplifies punched record reading.

Another object of the invention is the provision of an improved method of signalling operable with a punched record medium.

A further object of the invention is to provide a relatively inexpensive and compact translating system utilizing punched tape as the recording medium.

A still further object of the invention is to provide improved means for high-speed translation of coded information recorded in punched form on a paper tape.

The invention will be described in connection with a recording medium of the punched tape kind. In accordance with one embodiment of the invention, the punched tape is passed between an electrode and a plurality of signal sensing probes. A probe is provided for each possible perforated position in a transverse section of the tape and an auxiliary sensing probe is provided which is spaced from the electrode. A signal source is connected to the electrode and a balanced detector is connected to the sensing probes. Signals are transmitted from the electrode to all of the sensing probes simultaneously. The signals sensed by the signal sensing probes and the signal sensed by the auxiliary sensing probe are transmitted to the detector wherein the signals sensed by the signal sensing probes are balanced against the signal sensed by the auxiliary sensing probe. Information signals are generated by the detector corresponding to the information stored in punched hole form on the tape.

A feature of the invention is the provision of the balancing detector for obtaining a high hole to no-hole signal ratio.

A fuller understanding of the invention may be had from the following description taken in conjunction with the accompanying drawings wherein.

*Introduction*

Figure 1:
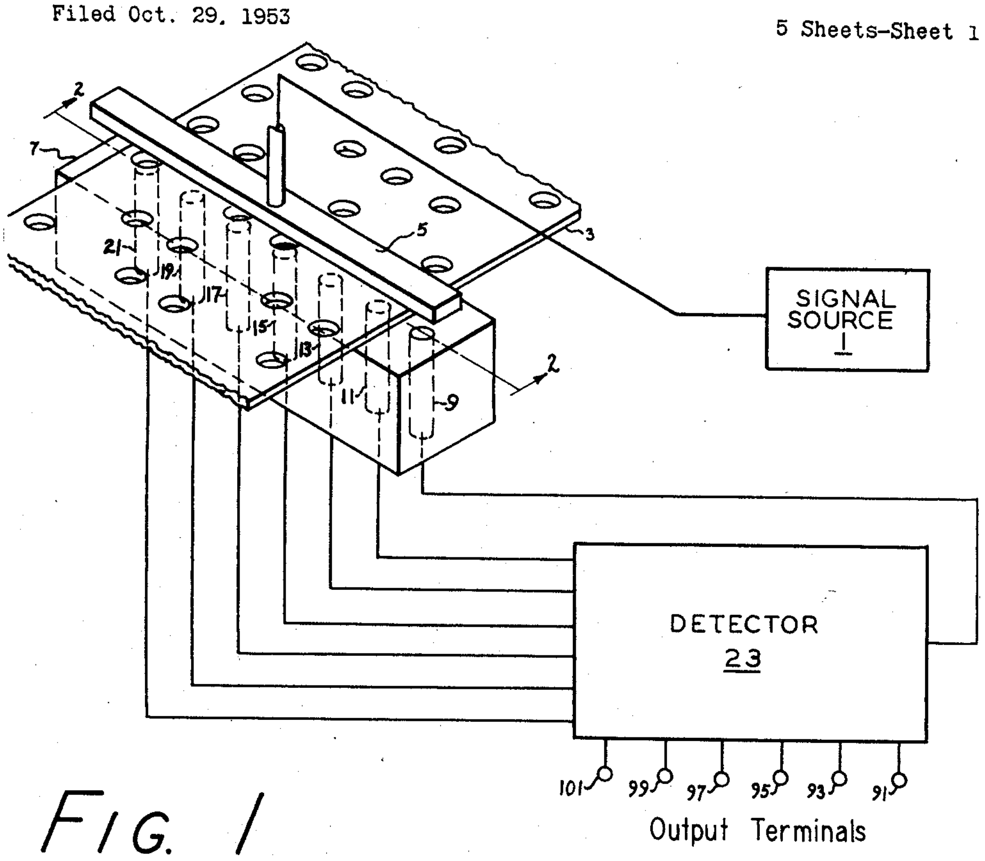
Fig. 1 is a schematic diagram, partly in perspective, of a punched tape translating system showing the relative arrangement of the various elements in accordance with one embodiment of the invention.

In order to simplify the description of the invention, the theory of the invention will be described generally with reference to the various embodiments disclosed in the drawing, each to be described in greater detail hereinafter.

Referring generally to Fig. 1 the dielectric between any one of the signal sensing probes (for example, probe 11) and the electrode may consist of air or air plus the composition of the tape depending upon whether the signal sensing probes are under perforated or non-perforated positions, while the dielectric between the auxiliary probe and the electrode is always air and corresponds to the condition that exists when a signal sensing probe is under a perforated position.

During operation, the signal sensed by a signal sensing probe that is under a perforated position is identical to the signal sensed by the auxiliary probe. However, the signal sensed by a signal sensing probe that is under a non-perforated position is greater in magnitude than that sensed by the auxiliary probe as the intermediate dielectric is greater than the dielectric between the auxiliary probe and the electrode.

Thus, the signal sensing probes under perforated positions of the tape detect a signal similar to the signal sensed by the auxiliary probe. Accordingly, the balanced detector remains balanced with respect to these signal sensing probes and no signal is produced at each output terminal of the detector circuit which corresponds to a signal sensing probe that is under a perforated position. This condition may be considered to represent the binary digit 1.

The signal sensing probes under non-perforated positions of the tape sense a change in the dielectric from that which exists between the auxiliary probe and the electrode, namely, from air to air plus the composition of the tape. Accordingly, the balanced detector becomes unbalanced with respect to these signal sensing probes and a signal is produced at each output terminal of the detector which corresponds to a signal sensing probe that is under a non-perforated position. This condition may correspondingly represent the binary digit 0.

Figure 4:
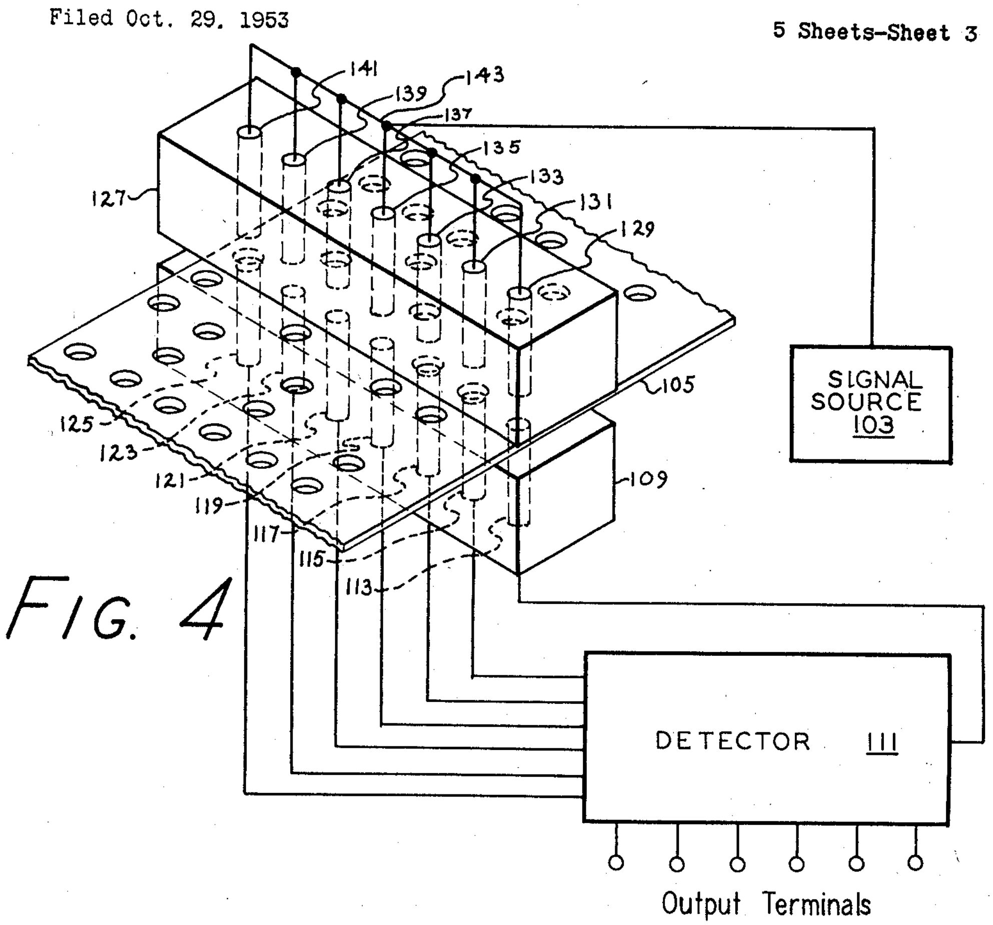
Fig. 4 is a schematic diagram, partly in perspective, of a punched tape translating system in accordance with another embodiment of the invention.

In accordance with the embodiment of the invention shown in Fig. 4 which may be used with a tape having uniform characteristics a similar arrangement is provided except that the auxiliary probe is now positioned under the tape. Therefore, a reference channel is employed which corresponds to unperforated positions on the tape. In addition, the electrode is replaced by a series of commonly connected signal probes equal in number and directly opposite each of the signal sensing probes.

Inasmuch as the dielectric between the auxiliary probe and the signal probe directly opposite it includes air plus the composition of the tape, rather than just air as in the previous embodiment, the signal sensed by the auxiliary probe will correspond to a signal sensed by a signal sensing probe that is under a non-perforated position of the tape. The signal sensing probes that are under perforated positions of the tape sense a dielectric (air) which is different from that sensed by the auxiliary probe. The presence of a hole and subsequent unbalance of the detector causes the production of a signal at the corresponding output terminal of the detector which may be considered to represent the binary digit 1. Likewise, the absence of a hole and retention of balance in the detector resulting in the non-production of a signal at the corresponding output terminal of the detector may represent the binary digit 0.

This system is ideally adaptable to punched card reading as a set of signal and signal sensing probes may be provided for each transverse section of the card thereby permitting simultaneous reading of each and every information position in the card.

In accordance with the embodiment of the invention shown in Fig. 5, the auxiliary or balancing probe is eliminated altogether by providing a different type of detection to be described in greater detail hereinafter.

In this embodiment the signal generated by the signal source is transmitted not only to the signal sensing probes via the electrode and through the tape, as before, but is also transmitted to a balancing circuit in the detector. The balancing circuit is adjusted to balance the received signal against the signals sensed by the signal sensing probes which are under non-perforated positions of the tape.

Thus, when the perforated tape is passed between the electrode and the signal sensing probes, the signals sensed by the signal sensing probes under non-perforated positions will be balanced out in the detector and no signals will be produced at the output terminals of the detector which correspond to signal sensing probes that are under non-perforated positions. However, the signal sensing probes which are under perforated positions of the tape will sense a different dielectric from that between the signal sensing probes under non-perforated positions and the electrode; namely, air rather than air plus the composition of the tape.

Consequently, the signal sensed by the signal sensing probes which are under perforated positions of the tape will be different from the signal sensed by the balancing circuit in the detector. The balanced detector becomes unbalanced with respect to these signal sensing probes and signals are produced at the output terminals of the detector which correspond to signal sensing probes that are under perforated positions.

It should be noted with respect to the embodiments so far described that the coded combination of signals produced at the output terminals of the detector, which corresponds to the condition of a transverse section of the tape, may represent a number, a letter, or an order in binary form. If information items are recorded in longitudinal channels of the tape rather than transverse sections, then the invention may be used for simultaneously reading an information position in each channel which is included in a transverse section of the tape.

Figure 7:
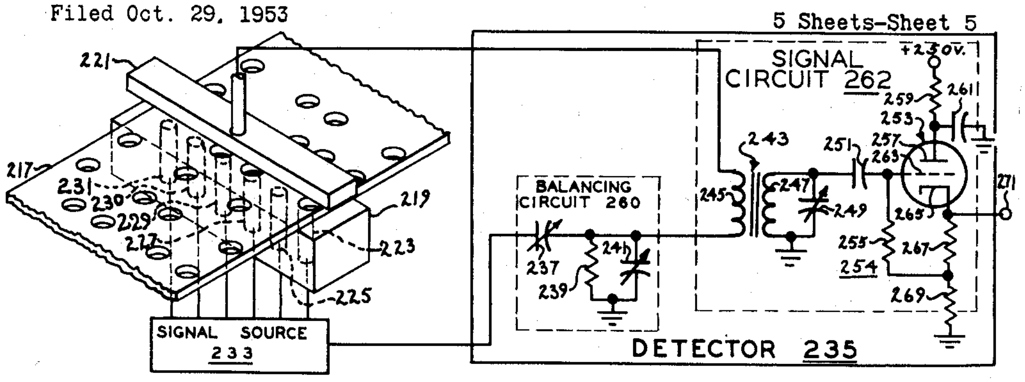
Fig. 7 is a schematic diagram, partly in perspective, of a punched tape translating system in accordance with a further embodiment of the invention.

In the embodiment of the invention shown in Fig. 7 (adopting the second mentioned method of balancing), the functions of the signal sensing probes and the electrode are reversed. That is, the signal sensing probes are used as signal probes, and the electrode is employed for sensing any change in the dielectric due to the presence of holes in a transverse section of the tape.

The signal probes are connected to a source which generates signals in timed sequence. Therefore, the signal probes transmit signals in succession through the tape to the electrode. The electrode senses each of the signals in succession and transmits them to the detector in serial form. The output of the detector will also be serial in form, the absence of a signal corresponding to a non-perforated position in the tape and the presence of a signal corresponding to a perforated position in the tape.

Figure 8:
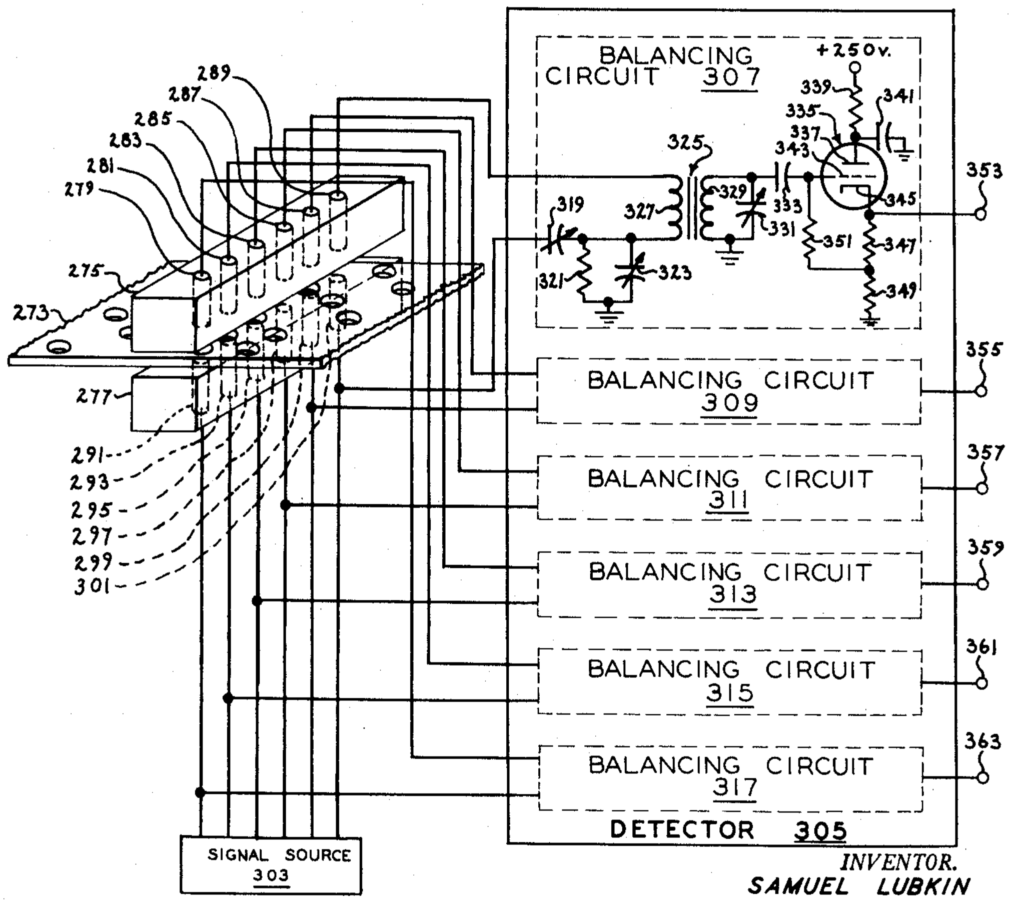
Fig. 8 is a schematic diagram, partly in perspective, of a still further embodiment of the invention.

The embodiment of the invention shown in Fig. 8 is similar to that shown in Fig. 7 except that the electrode is replaced by a series of signal sensing probes equal in number and directly opposite each of the signal probes. Further, a separate balancing circuit is provided for each pair of signal and signal sensing probes. This system is ideally suited for sequentially reading an information position in each longitudinal channel which is included in a transverse section of the tape.

Thus each information position in a transverse section of the tape is sequentially sensed and the signals are transmitted sequentially to each balancing circuit associated therewith. The balancing circuits are balanced for the non-perforated condition. The signal sensing probes which sense a change in the dielectric causes the associated balancing circuits to become unbalanced and corresponding signals are produced at the output terminals of the balancing circuit.

The absence of a signal at the output of a balancing circuit corresponds to a non-perforated position in the tape and may be considered to represent the binary digit 0. Likewise, the presence of a signal at the output of the balancing circuit corresponds to a perforated position in the tape and may be considered to represent the binary digit 1.

It should be noted from the embodiments of the invention described supra, that each translating system has the following characteristics.

The system is operable with a record medium having information recorded therein in coded form and comprises a signal source (which may include an electrode or a plurality of probes) positioned on one side of the record medium, a sensing means (which may include an electrode or a plurality of probes) positioned on the other side of the record medium, and a signal producing means (which may include a probe and detector or a detector alone) coupled to the signal source and the sensing means. The record medium varies the dielectric existing between the signal source and the sensing means in accordance with the information recorded therein such that when a signal is transmitted from the signal source via the record medium to the sensing means, the sensing means senses the transmitted signal in accordance with the information recorded in the record medium. The signal producing means responds to the transmitted signal and the signal sensed by the sensing means to produce a combination of signals indicative of the information recorded in the record medium.

Thus, a simplified punched tape reading device is provided which operates at high speed and yet is relatively inexpensive and compact.

*Detailed description*

Referring now to the drawings in detail, and particularly to Fig. 1, data appears on a tape 3 in the form of a series of perforations according to a selected code, which in this case is arbitrarily chosen to be a six-position code. The tape 3 passes between an electrode 5 and a support 7. The support 7 is made of a good insulating material such as "Bakelite" and has a plurality of holes passing through it to accommodate a series of signal sensing probes 11, 13, 15, 17, 19 and 21, there being a signal sensing probe for each possible perforated position in a transverse section of the tape 3. An auxiliary or balancing probe 9 is provided for balancing purposes to be explained hereinafter.

Figure 2:
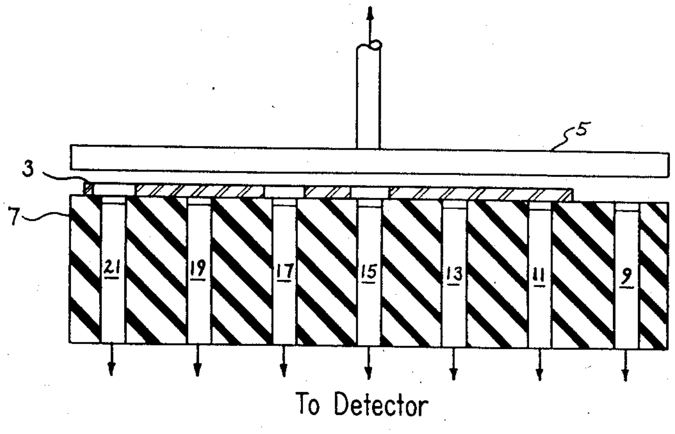
Fig. 2 is a sectional view taken on line 2—2 of Fig. 1.

The relationship of the electrode 5, the tape 3, the support 7 with the probes 9, 11, 13, 15, 17, 19 and 21 is shown in cross section in Fig. 2.

Referring to Fig. 1, a signal source 1 is connected to the electrode 5. The signal source may be any type of standard alternating signal source, such as a Hartley oscillator feeding a cathode follower.

Each of the probes 9, 11, 13, 15, 17, 19 and 21 are connected to a detector 23. The detector 23 (see Fig. 3) is composed of a plurality of signal circuits corresponding to each of the signal sensing probes, and a balancing circuit corresponding to the balancing probe.

The signal sensing probes 11, 13, 15, 17, 19 and 21 are connected to the signal circuits 25, 27, 29, 31, 33 and 35, respectively, while balancing probe 9 is connected to the balancing circuit 37. Since each of the signal circuits are identical in circuitry, only the details of signal circuit 25 are shown.

Signal sensing probe 11 is connected to one end of a tank circuit composed of variable capacitor 39 and inductor 41 in parallel. The other end of the tank circuit is connected to ground. Signal sensing probe 11 is also connected via capacitor 43 to a triode vacuum tube 47.

The triode 47 includes an anode 49 connected via resistor 51 to a positive supply bus having a potential of two hundred and fifty volts, and via decoupling capacitor 53 to ground, a grid 50, and a cathode 55 connected via resistors 57 and 59 in series to ground. A grid resistor 45 is connected between grid 50 and the junction of resistors 57 and 59. The triode 47 and associated circuitry function as a cathode follower.

The output of the cathode follower, that is, cathode 55, is connected to one end of the primary winding 63 of transformer 61. The ends of the secondary winding 65 of transformer 61 are connected across a variable capacitor 67 to form a tank circuit. One end of the tank circuit is connected to ground while the other end of the tank circuit is connected to the output terminal 91. The other end of the primary winding 63 and each of the other similar ends of the corresponding primary windings in the signal circuits 27, 29, 31, 33 and 35 are connected to a common junction point 68.

The balancing probe 9 is connected to one end of a tank circuit composed of a variable capacitor 87 and inductor 89 in parallel while the other end of the tank circuit is connected to ground. The balancing probe 9 is also connected via capacitor 85 to a triode vacuum tube 69.

The triode 69 includes an anode 71 connected via resistor 73 to a positive supply bus having a potential of two hundred and fifty volts and via decoupling capacitor 70 to ground, a grid 75, and a cathode 77 connected via resistors 79 and 81 in series to ground. A grid resistor 83 is connected between grid 75 and the junction of resistors 79 and 81.

The triode 69 and associated circuitry function as a cathode follower. The output of the cathode follower, that is, cathode 77, is connected to the junction point 68.

Figure 3:
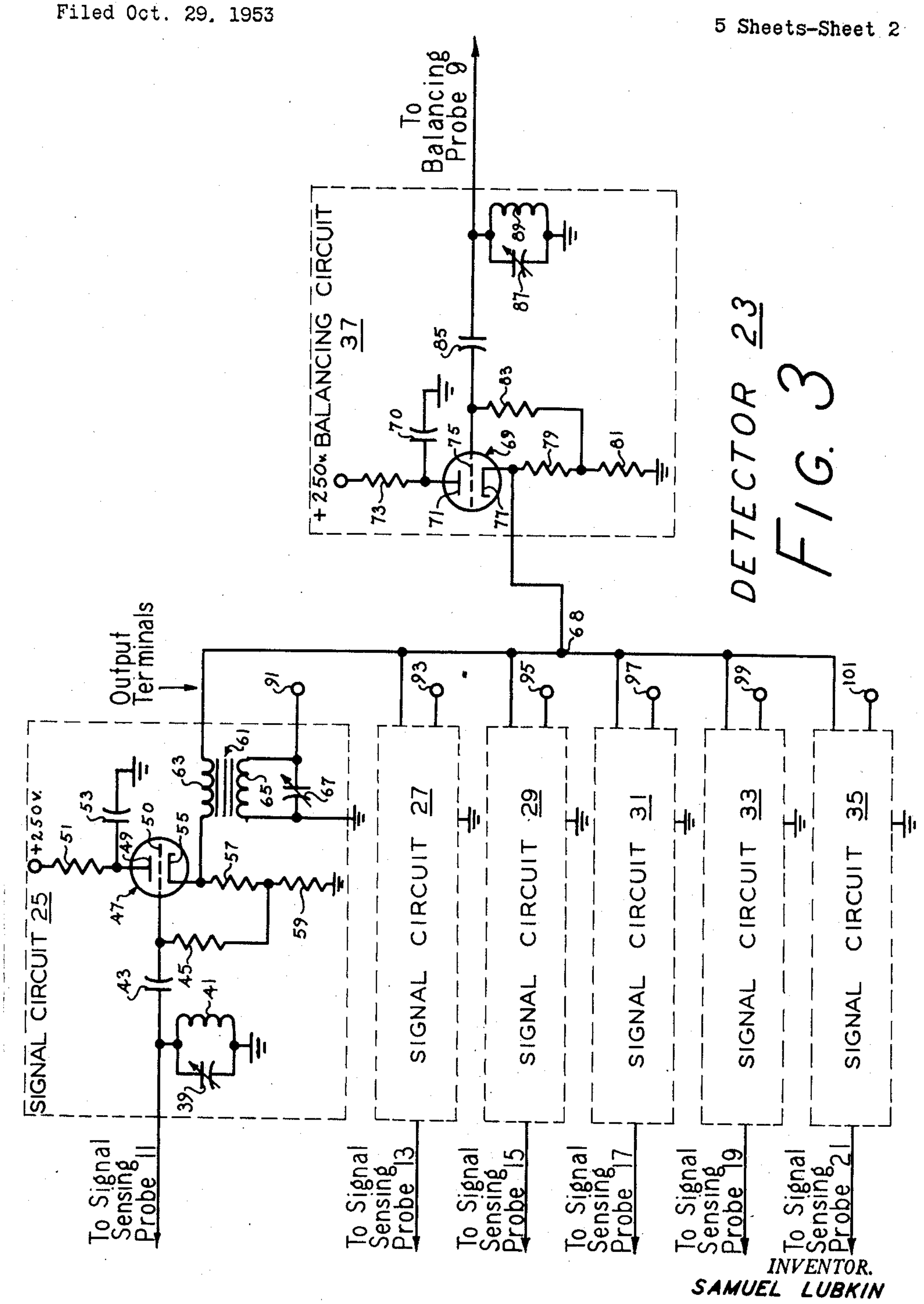
Fig. 3 is an electrical circuit arrangement of the detector shown in block form in Fig. 1.

In operation, each of the tank circuits in detector 23 are tuned to the frequency of the signal being produced by the signal source 1 (see Fig. 1). Inasmuch as each of the signal circuits 25, 27, 29, 31, 33 and 35 and the balancing circuit 37 of Fig. 3 are identical and the balancing probe 9 and the signal sensing probes 11, 13, 15, 17, 19 and 21 are equally spaced from the electrode 5, the detector 23 is in a balanced condition and no output signal will be produced at the output terminals 91, 93, 95, 97, 99 and 101.

It should be observed that this is the same condition which exists when all of the signal sensing probes are under perforated positions in the tape 3.

The tape 3 (see Figs. 1 and 3) is then moved between electrode 5 and support 7 by a tape feeding mechanism (not shown). When a signal sensing probe, such as signal probe 11 for example, is under a non-perforated position in the tape 3, the signal circuit associated therewith becomes unbalanced with respect to the balancing circuit 37, as the dielectric existing between the electrode 5 and the signal sensing probe 11 is different from that which exists between the balancing probe 9 and the electrode 5 due to the addition of the tape material between the electrode 5 and the signal sensing probe 11.

Therefore, the signal sensing probe 11 senses a signal which is greater in magnitude than that sensed by the balancing probe 9. Consequently, the potential at the output of the cathode follower of signal circuit 25 is greater in magnitude than the output of the cathode follower of the balancing circuit 37. Inasmuch as the primary winding 63 of transformer 61 is connected between these two points, current will now flow through the primary winding 63 and a signal will be produced at the output terminal 91.

When a signal sensing probe, such as signal sensing probe 11, is under a perforated position in the tape 3, the signal circuit associated therewith remains balanced with respect to the balancing circuit 61, as the dielectric existing between signal sensing probe 11 and the electrode 5 is identical to that which exists between the balancing probe 9 and the electrode 5.

Therefore, the signal sensing probe 11 when under a perforated position of the tape senses a signal which is identical to that sensed by the balancing probe 9. Consequently, the potential at the output of the cathode follower of signal circuit 25 will be equal to the output of the cathode follower of the balancing circuit 37 and no current will flow through the primary winding 63 of transformer 61. Therefore, no signal will be produced at the output terminal 91.

To further illustrate this, the transverse section of the tape 3 under the electrode 5 contains perforated holes over the signal sensing probes 15, 17 and 21. Thus, the dielectric existing between the signal sensing probes 15, 17 and 21 and the electrode 5, and the dielectric existing between the balancing probe 9 and the electrode 5 is identical. Therefore, the signals sensed by these probes will be identical and the balanced condition will be retained. Hence, no signals will be produced at the output terminals 95, 97 and 101 associated with the signal circuits 29, 31 and 35.

However, the dielectric existing between the signal sensing probes 11, 13 and 19 and the electrode 5 is greater in magnitude than that existing between the balancing probe 9 and the electrode 5 due to the presence of the non-perforated portions of the tape 3.

Consequently, the signals sensed by the signal sensing probes 11, 13 and 19 are greater in magnitude than that sensed by the balancing probe 9 causing the signal circuits 25, 27 and 33 to become unbalanced with respect to the balancing circuit 37. Hence, signals will be produced at the output terminals 91, 93 and 99 associated with the signal circuits 25, 27 and 33.

The presence or absence of signals at the output terminals 91, 93, 95, 97, 99 and 101 of detector 23 may therefore designate a number, letter or order in binary form, or the signals may represent a binary digit of a larger information item recorded in each channel of the tape 3.

Referring now to Fig. 4, another embodiment of the invention is shown wherein the detector is balanced for the non-perforated condition rather than the perforated condition as in the previous embodiment.

A perforated tape 105 having uniform dielectric characteristics lies between a pair of supports 109 and 127, each made of an insulating material such as "Bakelite." Support 109 has a plurality of holes passing through it to accommodate a series of signal sensing probes 115, 117, 119, 121, 123 and 125; there being a signal sensing probe for each possible perforated position in a transverse section of the tape 105, and an auxiliary or balancing probe, namely, probe 113, for balancing purposes as explained hereinbefore. The balancing probe 113 is associated with a reference channel of tape 105 which is unperforated.

Support 127 has a plurality of holes passing through it to accommodate a series of signal probes 129, 131, 133, 135, 137, 139 and 141, there being a signal probe corresponding to each probe in the support 109. All of the signal probes are commonly connected to a plate 143 which, in turn, is connected to a standard alternating signal source 103. This arrangement is used to direct signals from the probes in support 127 to the probes in support 109 in a more positive manner. Further, the balancing probe 113 and the signal sensing probes 115, 117, 119, 121, 123 and 125 are all connected to a detector 111 of the type shown in Fig. 3.

The signal sensing probes 115, 117, 119, 121, 123 and 125 are connected to the signal circuits in detector 111 while the balancing probe 113 is connected to the balancing circuit in detector 111.

The dielectric existing between the balancing probe 113 and the signal probe 129 is composed of air plus the composition of the tape. Therefore, the detector 111 will be balanced with respect to those signal sensing probes that are under non-perforated positions in the tape.

In operation the tape 105 is moved between the supports 109 and 127 by a tape feeding means (not shown). A signal is transmitted to the plate 143 from signal source 103 which, in turn, is transmitted via the signal probes 129, 131, 133, 135, 137, 139 and 141 through the tape 105 to the signal sensing probes 115, 117, 119, 121, 123 and 125 and the balancing probe 113. The signals sensed by the signal sensing probes 115, 117, 119, 121, 123 and 125 are transmitted to the detector 111 and compared against the signal sensed by the balancing probe 113 which is also transmitted to the detector 111.

The dielectric existing between the signal sensing probes that are under non-perforated positions of the tape and their corresponding signal probes is identical to the dielectric existing between the balancing probe 113 and its corresponding signal probe 129.

Consequently, the signal sensed by the balancing probe 113 and the signals sensed by the signal sensing probes that are under non-perforated positions in the tape will be identical and the detector 111 will remain balanced with respect to those signal sensing probes and no signal will be produced at the output terminals of detector 111.

However, the signal sensing probes that are under perforated positions of the tape will sense a different signal than that sensed by the balancing probe 113 due to the different dielectric existing between those signal sensing probes and their corresponding signal probes from that which exists between the balancing probe 113 and the signal probe 129.

Consequently, the detector 111 will become unbalanced with respect to those signal sensing probes and a signal will be produced at the output of the detector 111. For example the transverse section of the tape 105 under support 127 contains perforated holes over the signal sensing probes 115, 117 and 125. Therefore, signals will be produced at the output terminals of detector 111 which are associated with the signal sensing probes 115, 117 and 125, while no signals will be produced at the output terminals of detector 111 which are associated with the signal sensing probes 119, 121 and 123.

It should be noted that if a tape feeding mechanism is used which requires a perforated channel of the tape for feeding purposes, then the perforations of that channel may also be sensed and used for information location purposes.

Figure 5:
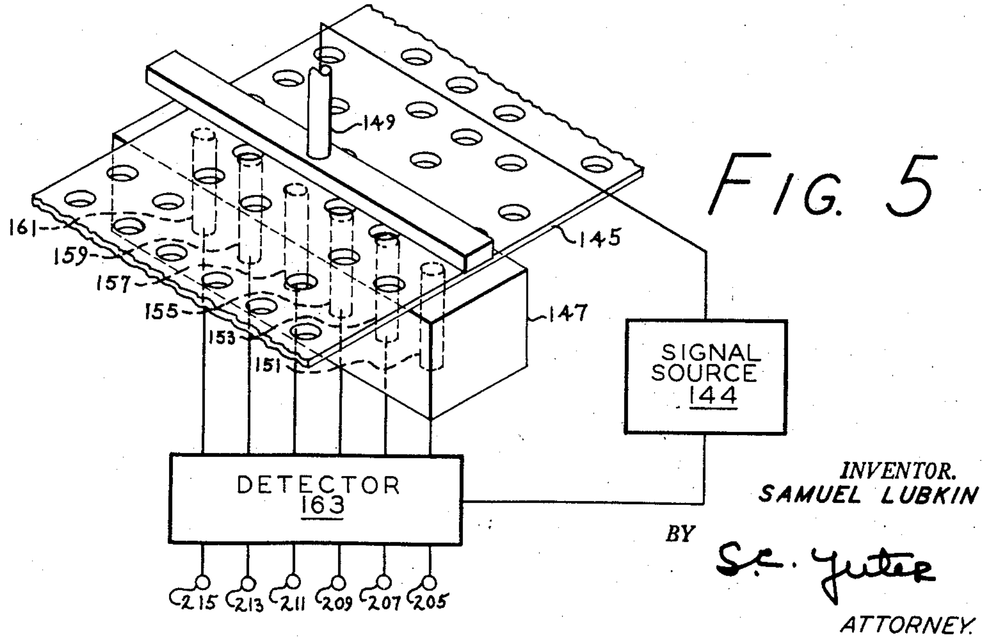
Fig. 5 is a schematic diagram, partly in perspective, of still another embodiment of the invention.

Referring now to Fig. 5 another embodiment of the invention is shown in which the auxiliary or balancing probe is eliminated by providing a different type of detection.

A perforated tape 145 is shown between support 147 and electrode 149. The support 147 is made of an insulating material such as "Bakelite" and has a plurality of holes passing through it to accommodate a series of signal sensing probes 151, 153, 155, 157, 159 and 161, there being a signal sensing probe for each possible perforated position in a transverse section of the tape 145.

A standard alternating signal source 144 is connected to electrode 149 and a detector 163. The signal sensing probes 151, 153, 155, 157, 159 and 161 are connected to detector 163 which is shown in detail in Fig. 6.

Figure 6:
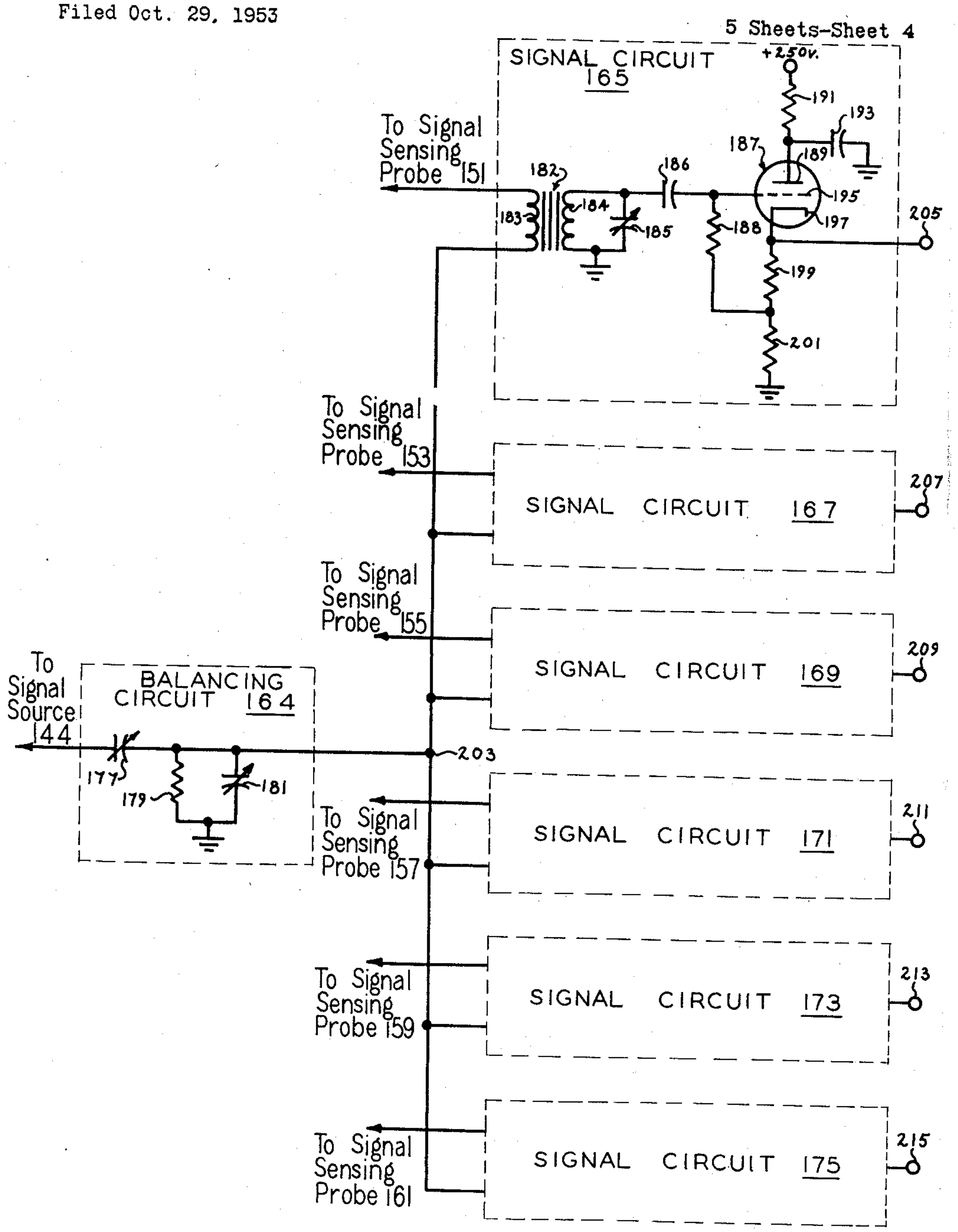
Fig. 6 is the electrical circuit arrangement of the detector shown in block form in Fig. 5.

The detector 163 is composed of a plurality of signal circuits corresponding to each of the signal sensing probes, and a balancing circuit. The signal sensing probes 151, 153, 155, 157, 159 and 161 are connected to signal circuits 165, 167, 169, 171, 173 and 175, respectively, while the signal source 144 is connected to the balancing circuit 164. Each of the signal circuits are identical in circuitry, therefore, only the circuitry of signal circuit 165 is shown in Fig. 6.

Signal sensing probe 151 is connected to one end of the primary winding 183 of transformer 182. The other end of the primary winding 183 and each of the other similar ends of the primary windings in the signal circuits 167, 169, 171, 173 and 175 are connected together and to a common junction point 203. The secondary winding 184 of transformer 182 is in parallel with a variable capacitor 185 to form a tank circuit. One end of the tank circuit is connected to ground while the other end of the tank circuit is coupled via capacitor 186 to the vacuum tube triode 187.

The triode 187 includes an anode 189 connected via resistor 191 to a positive supply bus having a potential of two hundred and fifty volts and via capacitor 193 to ground, a grid 195, and a cathode 197 connected via resistors 199 and 201 in series to ground. A grid resistor 188 is connected between the grid 195 and the junction of resistors 199 and 201. An output terminal 205 is connected to the cathode 197. The triode 187 and associated components are arranged to form a cathode follower circuit.

The standard signal source 144 is connected to one end of the variable capacitor 177 of the balancing circuit 164. One end of resistor 179 and one end of variable capacitor 181 are jointly connected to the other end of variable capacitor 177, while the other end of resistor 179 and the other end of variable capacitor 181 are connected to ground. The junction of resistor 179, variable capacitor 181 and variable capacitor 177 is connected to the junction point 203.

The operation will be described with reference to Figs. 5 and 6. Each of the tank circuits in detector 163 is tuned to the frequency of the signal being produced by the standard signal source 144. For initial balancing purposes a transverse section of non-perforated tape is placed over the signal sensing probes 151, 153, 155, 157, 159 and 161. A signal is transmitted from the standard signal source to the electrode 149 and through the tape to the signal sensing probes 151, 153, 155, 157, 159 and 161. The signal transmitted to the electrode 149 is also transmitted to the balancing circuit 164.

The variable capacitors 177 and 181 are adjusted such that the magnitude and phase of the signal at point 203 will be equal to that of the signals sensed by each of the signal sensing probes 151, 153, 155, 157, 159 and 161. No current will flow through each of the primary windings, such as primary winding 183, in the signal circuits 165, 167, 169, 171, 173 and 175. The detector 163 will then be in a balanced condition and no signal will be produced at the output terminals 205, 207, 209, 211, 213 and 215.

It should be noted that the detector 163 could have been balanced for the perforated condition as well, merely by having no tape present between the signal sensing probes and the electrode and adjusting the variable capacitors 177 and 181 for that condition. Whichever method is used depends on whether it is desired to obtain an output signal from the detector 163 corresponding to the presence or absence of a hole in the tape.

The tape 145 is then made to pass between the support 147 and the electrode 149 by a tape feeding means (not shown). The signals sensed by the signal sensing probes 151, 153, 155, 157, 159 and 161 are transmitted to the detector 163 and compared against the signal generated by the standard signal source 144 which is also transmitted to the detector 163.

When a signal sensing probe, such as signal sensing probe 151 for example, is under a non-perforated position in tape 145, the signal circuit associated therewith remains balanced with respect to the balancing circuit 164 as this is the condition under which the detector was originally balanced.

Therefore, the potential of the junction point 203 will be equal to the potential of the signal sensing probe 157 and no current will flow through the primary winding 183 of transformer 182. Therefore, no signal will be produced at the output terminal 205.

When a signal sensing probe, such as signal sensing probe 151 for example, is under a perforated position in the tape 145, the signal circuit associated therewith becomes unbalanced with respect to the balancing circuit 164 as the dielectric existing between the electrode 149 and the signal sensing probe 151 is different from that which exists for the balanced condition due to the presence of a perforation in the tape 145.

Therefore, the signal sensing probe 151 senses a signal which is different from that being produced by the standard signal source 144. Consequently, the potential of the signal sensing probe 151 is different from that which exists at the junction point 203 causing current to flow through the primary winding 183 of transformer 182 and a signal to be produced at the output terminal 205.

To further illustrate this, the transverse section of the tape 145 under electrode 149 contains perforated holes over the signal sensing probes 153, 155 and 159. Therefore, signals will be produced at the output terminals 207, 209 and 213 of detector 163 while no signals will be produced at the output terminals 205, 211 and 215 of detector 163. Thus, the presence or absence of signals at the output terminals of detector 163 may be used to designate information in binary form.

Referring to Fig. 7, a further embodiment of the invention is shown for obtaining a serial representation of information recorded on a punched tape. The functions of the signal sensing probes and the electrode are reversed from that which existed for the previous embodiment, namely, by using the signal sensing probes as signal probes and the electrode for sensing any change in the dielectric existing between the signal probes and the electrode due to the presence of a hole or holes in a transverse section of the tape.

The tape 217 lies between an electrode 221 and a support 219. The support 219 is made of an insulating material such as "Bakelite" and has a plurality of holes passing through it to accommodate a series of signal probes 223, 225, 227, 229, 230 and 231, there being a signal probe for each possible perforated position in a transverse section of the tape 217. A timed-sequence signal source 233 is connected to the series of signal probes.

The signal source 233 includes any type of standard alternating signal source or a standard clock pulse generator (not shown). The timed sequence may be obtained by feeding signals from the alternating signal source to a stepping switch having a plurality of positions equal in number to the number of signal probes in the support 219, or by feeding signals from the clock pulse generator to a register composed of a delay line and reshapers, the delay line having a plurality of taps equal in number to the number of signal probes in the support 219.

The electrode 221 and the output of the signal source 233 is connected to a detector 235 which is composed of a balancing circuit 260 and a signal circuit 262.

The output from the signal source 233 is applied to one end of a variable capacitor 237. The other end of the variable capacitor 237 is connected to one end of resistor 239 and to one end of variable capacitor 241. The other end of resistor 239 and the other end of variable capacitor 241 are connected to ground. The junction of variable capacitor 237, resistor 239 and variable capacitor 241 is connected to one end of the primary winding 245 of transformer 243. The electrode 221 is connected to the other end of the primary winding 245. The secondary winding 247 of transformer 243 is connected in parallel with a variable capacitor 249 to form a tank circuit. One end of the tank circuit is connected to ground while the other end is connected via capacitor 251 to the cathode follower 253.

The cathode follower 253 includes a triode 254 having an anode 257 connected via resistor 259 to a positive supply bus having a potential of two hundred and fifty volts and via decoupling capacitor 261 to ground, a grid 263, and a cathode 265 connected via resistors 267 and 269 in series to ground. A grid resistor 255 is connected between grid 263 and the junction of resistors 267 and 269. The output terminal 271 of detector 235 is connected to the cathode 265.

In operation the detector 235 is initially balanced for the non-perforated condition as before. The tape 217 is then moved between the support 219 and the electrode 221 by a tape feeding means (not shown). The tape feed is timed such that the signal sensing probes have sufficient time to sense a transverse section of the tape before the tape is fed to the next tape sensing position.

A sequential series of signals is transmitted from the signal source 233 to the signal probes 223, 225, 227, 229, 230 and 231 and through the tape 217 to the sensing electrode 221. The signals sensed by the electrode 221 are sequentially transmitted to the detector 235 and compared against the signal produced by the signal source 233 which is also transmitted to the detector 235.

When a signal probe, such as probe 223 for example, is under a non-perforated position in tape 217, the detector 235 remains balanced as this is the condition that obtains when the detector 235 was originally balanced. Therefore, the potential at the junction of variable capacitor 237, resistor 239 and variable capacitor 241 is equal to the potential of the electrode 221 and no current will flow through the primary winding 245 of transformer 243. Hence, no signal will be produced at the output terminal 271.

When a signal probe, such as signal probe 223, is under a perforated position in tape 217, the detector 235 becomes unbalanced as the dielectric existing between the electrode 221 and the signal probe 223 is different from that which exists for the balanced condition due to the presence of a perforation in the tape 217. Therefore, the electrode 221 senses a signal which is different from that being produced by the standard signal source 233.

Consequently, the potential at the junction of variable capacitor 237, resistor 239 and variable capacitor 241 is different from that which exists at the electrode 221 causing current to flow through the primary winding 245 of transformer 243 and a signal to be produced at the output terminal 271.

To illustrate this further, a transverse section of the tape 217 under electrode 221 contains perforated holes over the signal probes 223, 227 and 229. Therefore, the detector 235 will remain balanced when signals are being transmitted to the signal probes 225, 230 and 231 and no signal will be produced at the output terminal 271 at those times. However, the detector 235 will become unbalanced when signals are transmited to the signal probes 223, 227 and 229 and signals will be produced at the output terminal 271 at those times. The serial sigal being produced at the output terminal 271 of detector 235 may therefore represent the binary number 101100.

Referring to Fig. 8, another embodiment of the invention is shown for obtaining a serial representation of information recorded on the punched tape 273 which is passed between the support 275 and the support 277. The support 275 has a plurality of holes passing through it to accommodate a series of signal sensing probes 279, 281, 283, 285, 287 and 289, there being a signal sensing probe for each possible perforated position in a transverse section of the tape 273. The support 277 has a plurality of holes passing through it to accommodate a series of signal probes 291, 293, 295, 297, 299 and 301, there being a corresponding signal probe for each signal sensing probe in support 275.

A timed sequence signal source 303 is connected to the signal probes 291, 293, 295, 297, 299 and 301. The signal sensing probes 279, 281, 283, 285, 287 and 289 and the output of the signal source 303 are connected to corresponding points in a detector 365 which is composed of balancing circuits 307, 309, 311, 313, 315 and 317. Inas much as the balancing circuits are identical only balancing circuit 307 is shown in detail.

It will be noted that each pair of signal probe and signal sensing probe and its corresponding balancing circuit is identical to the circuitry shown in Fig. 7 and operates in exactly the same manner. Therefore, the absence of a signal at the output of detector 305 corresponds to the absence of a hole in tape 273. Likewise the presence of the signal at the output of detector 305 corresponds to the presence of a hole in the tape 273.

To illustrate this further, a transverse section of the tape between supports 275 and 277 contains perforated holes over the signal probes 293, 295, 299. Therefore, the detector 305 will remain balanced when signals are being transmitted to the signal probes 291, 297 and 301 and no signals will be produced at the output terminals 363, 357 and 353, respectively, at those times. However, the detector 305 will become unbalanced when signals are transmitted to the signal probes 293, 295 and 299 and signals will be produced at the output terminals 361, 359 and 355, respectively, at those times.

The sequential signals being produced at the output terminals 353, 355, 357, 359, 361 and 363 of detector 305 may represent the binary digit 0 in the information position of the longitudinal channel of tape 273 associated with the probes 289 and 301, the binary digit 1 in the information position of the longitudinal channel associated with the probes 287 and 299, the binary digit 0 in the information position of the longitudinal channel associated with the probes 285, 297, the binary digit 1 in the information position of the longitudinal channel associated with the probes 283 and 295, the binary digit 1 in the information position of the longitudinal channel associated with the probes 281 and 293, and the binary digit 0 in the information position of the longitudinal channel associated with the probes 279 and 291.

Therefore, the invention provides a simplified punched tape reading device which is relatively inexpensive and compact and yet which is capable of translating information recorded in punched tape into corresponding electrical signals at high speed.

While various embodiments of the invention have been disclosed it will be understood that various modifications may be made therein which are within the spirit and scope of the invention.

What is claimed is:

1. A tape reading device operable with a tape having information stored therein in the form of combinations of perforations, a signal source including an electrode space above and extending transversely across said tape, a plurality of signal sensing probes corresponding to said electrode spaced below said tape, a signal sensing probe being provided for each possible perforated position in the transverse section of said tape, an auxiliary sensing probe provided adjacent said plurality of signal sensing probes and spaced from said electrode, said auxiliary sensing probe receiving a signal corresponding to a signal sensing probe that is under a perforated position in said tape, said signal source transmitting a signal via said tape to all of said sensing probes, and means coupled to said sensing probes for comparing the signals sensed by said signal sensing probes with the signal sensed by said auxiliary sensing probe and producing signals corresponding to the information stored in said tape.

2. A tape reading device operable with a tape having information stored therein in the form of combinations of perforations, a signal source, a plurality of signal probes above and spaced transversely across said tape, a plurality of signal sensing probes and an auxiliary sensing probe spaced below said tape in positions corresponding to said plurality of signal probes, a signal sensing probe being provided for each possible perforated position in the transverse section of said tape, said auxiliary sensing probe receiving a signal corresponding to a signal sensing probe that is under a non-perforated position in said tape, said plurality of signal probes being responsive to said signal source for transmitting signals via said tape to said corresponding sensing probes, and means coupled to said sensing probes for comparing the signals sensed by said signal sensing probes with the signal sensed by said auxiliary probe and producing signals corresponding to the information stored in said tape.

3. A record translator operable with a record medium having information stored therein in punched hole form comprising signal means for producing a signal, a signal transmitting means, means for conducting said signal to said signal transmitting means, sensing means adjacent said transmitting means, said record medium being positioned directly between said transmitting means and said sensing means so that the signal produced by said signal means is transmitted via said record medium to said sensing means, said sensing means being responsive to the transmitted signal in accordance with the information stored in said record medium, and comparing means jointly controlled by the signal from said signal means and by the output of said sensing means to produce an output signal indicative of the information stored in said record medium.

4. A record translator operable with a record medium having information stored in information positions of said record medium comprising signal means for producing a signal, a signal transmitter, means for conducting said signal to said signal transmitter, a standard signal receiving means and a sensing means adjacent said transmitter, said record medium being positioned directly between said transmitter and said receiving and sensing means, the signal produced by said signal means being transmitted to said standard signal receiving means and to said sensing means, said sensing means sensing the transmitted signal to produce sensed signals in accordance with the information stored in said record medium, and means rendered effective by said sensing means and said standard signal receiving means for producing a signal indicative of the information stored in said record medium.

5. A record translator operable with a record medium having information stored therein in accordance with the coded information positions in said record medium, comprising signaling means for generating a signal, a plurality of signal sensing probes associated with said record medium, an auxiliary sensing probe associated with said signaling means, said record medium being positioned directly between said signaling means and said sensing means, the generated signal being transmitted to said auxiliary sensing probe and to said plurality of signal sensing probes, said auxiliary sensing probe being responsive to the transmitted signal and producing a standard signal, said plurality of signal sensing probes being responsive to the transmitted signal in accordance with the information stored in said record medium, and means for comparing the signals sensed by each of said plurality of signal sensing probes with the standard signal produced by said auxiliary sensing probe and producing a plurality of signals corresponding to the information stored in said record medium.

6. A tape reading device operable with a perforated tape having information recorded therein in coded form, a signal source positioned on one side of said perforated tape, sensing means positioned on the other side of said perforated tape, a comparison means, an auxiliary sensing means associated with said signal source for producing a standard signal, the information on said perforated tape being so recorded as to vary the dielectric constant existing between said signal source and said sensing means in accordance with the information recorded therein, said signal source transmitting a signal to said auxiliary sensing means and via said perforated tape to said sensing means, both said sensed signals being transmitted to said comparison means for producing a resultant signal indicative of the information recorded in said perforated tape.

7. A tape reading device operable with a perforated tape having information stored therein in coded form, a signal source, said signal source providing a standard signal, a conductor provided at one side and extending across said perforated tape, a plurality of sensing probes directly opposed to said conductor at the opposite side of said perforated tape, said perforated tape varying the dielectric existing between said conductor and said plurality of sensing probes, said conductor being connected to said signal source and transmitting said standard signal via said perforated tape to said plurality of sensing probes, a first faction of said plurality of sensing probes receiving said standard signal through the non-perforated portion of said tape, a second faction of said plurality of sensing probes directly responsive to said standard signal, a balancing probe, and a comparing means, said balancing probe connected to said comparing means and transmitting said standard signal to tune said comparing means, said first faction and said second faction of said sensing probes transmitting signals to said comparing means for comparison, said comparing means producing resultant signals indicative of the information stored in said tape.

References Cited in the file of this patent

UNITED STATES PATENTS

| | | |
|---|---|---|
| 1,855,569 | Chireix | Apr. 26, 1932 |
| 2,266,779 | Loughridge et al. | Dec. 23, 1941 |
| 2,294,681 | Moon | Sept. 1, 1942 |
| 2,512,879 | Roggenstein | June 27, 1950 |
| 2,546,784 | Roggenstein | Mar. 27, 1951 |
| 2,567,552 | Cronin | Sept. 11, 1951 |

FOREIGN PATENTS

| | | |
|---|---|---|
| 622,819 | Great Britain | May 9, 1949 |